United States Patent Office  3,646,062
Patented Feb. 29, 1972

3,646,062
S,S-SUBSTITUTED 2,2-DI-THIO-, SULFINYL-, AND SULFONYL-ALKANAL AND ALKANONE N-SUBSTITUTED CARBAMOYLOXIMES
Tomas L. Fridinger and Edward L. Mutsch, Woodbury Township, Washington County, Minn., assignors to Minnesota Mining and Manufacturing Company, St. Paul, Minn.
No Drawing. Continuation-in-part of application Ser. No. 753,752, Aug. 19, 1969. This application July 11, 1969, Ser. No. 841,142
Int. Cl. C07c *131/00;* C07d *71/00, 73/00*
U.S. Cl. 260—327 M                                    7 Claims

ABSTRACT OF THE DISCLOSURE

New oximes having the formula

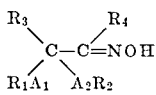

are reacted with selected isocyanates, or with phosgene followed by a reaction with a compound containing a reactive amino

function, to obtain S,S-substituted thio-, sulfinyl-, sulfonyl-alkanal and -alkanone N-substituted carbamoyloxime compounds having a high degree of effectiveness as nematocides, acaricides and insecticides when an effective amount of the compound is applied to plants or to the soil in which they are growing.

This application is a continuation-in-part of copending application Ser. No. 753,752, filed Aug. 19, 1968 now abandoned.

Certain alkanal and alkanone oxime carbamates are known to the art which possess insecticidal, miticidal or nematocidal activity, for example see U.S. Pats. 3, 299,137 and 3,217,037. However, compounds in which one alpha carbon atom of the alkanal or alkanone portion of an oxime is bonded to two substituted sulfur atoms, or their carbamate derivatives, have not been previously reported nor has the use of the latter as effective insecticides, acaricides and nematocides been suggested.

This invention relates to S,S-substituted 2,2-thio-, sulfinyl- and sulfonyl-alkanal and -alkanone oximes and their N-substituted carbamoyloxime derivatives. These novel carbamoyloxime derivatives possess insecticidal, acaricidal and nematocidal activity.

The present invention provides compounds of the formula

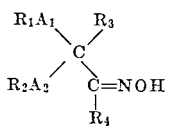

and their carbamoyloxime derivatives of the formula

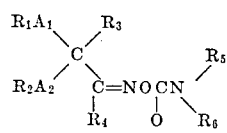

wherein $A_1$ and $A_2$ are independently selected from the group consisting of thio, sulfinyl and sulfonyl linkages, $R_1$, $R_2$ and $R_3$ are independently selected from the group consisting of alkyl and alkenyl having up to 4 carbon atoms, or $R_1$ and $R_2$ taken together form an alkylene or alkenylene group having up to 12 carbon atoms, having 2 to 5 carbon atoms in the chain linking the sulfur atoms, $R_4$ is hydrogen or alkyl having up to 4 carbon atoms, and $R_5$ and $R_6$ are independently selected from the group consisting of hydrogen and alkyl, cycloaliphatic, alkoxy and alkenyl radicals having up to about 10 carbon atoms, and only one of $R_5$ and $R_6$ may be hydrogen.

In the presently preferred compounds of the present invention $R_3$ is methyl or ethyl, $R_1$ and $R_2$ together either contain no more than 5 carbon atoms or form an alkylene linking group having 2 or 3 carbon atoms in the chain linking the sulfur atoms. $R_4$ is hydrogen, $R_5$ is methyl or ethyl and $R_6$ is hydrogen. Such compounds are preferred because they exhibit a superior degree of nematocidal activity although all of the compounds disclosed herein have a degree of nematocidal action.

The oxime compounds used as starting materials in both of the above described alternative synthetic procedures may be prepared from the corresponding aldehydes or ketones by reaction with hydroxylamine hydrochloride in the presence of an acid acceptor such as potassium acetate in a suitable solvent such as ethanol.

Some exemplary oximes are the following:

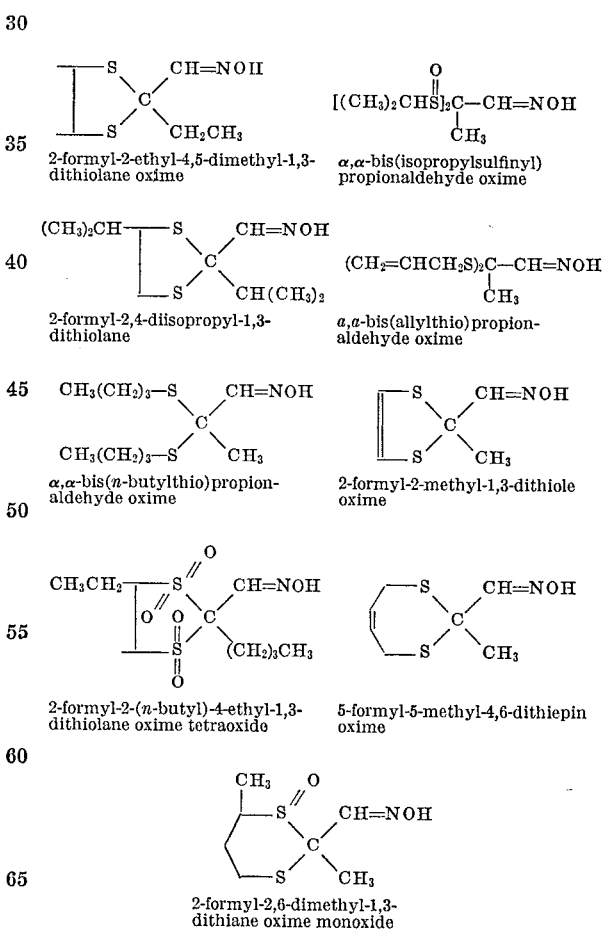

The aldehyde and ketone precursors used to prepare useful oximes may be prepared by methods known to the art, e.g. the reaction of alpha-ketoaldehydes with mercaptans as described by Tomas L. Fridinger, Ph.D. Thesis, University of Maryland, 1967 (it has been discovered that this reaction may also be applied to alpha-diketones), or the formylation or alkanoylation of dithio-substituted carbon atoms in the presence of very strong bases, as described by E. J. Corey et al., Angewandte Chemie, International edition, 4, 1075 (1965).

When the reaction of alpha-ketoaldehydes with mercaptans is applied to symmetrical alpha-diketones, only one isomeric ketomercaptol is possible. When this reaction is applied to unsymmetrical alpha-diketones, isomeric mixtures of ketomercaptols are obtained which must be separated.

The carbamoyloxime compounds of this invention can be prepared in a variety of ways from the correspondingly substituted oximes. One synthetic route involves addition of an isocyanate to the substituted oxime having $R_1$, $R_2$, $R_3$, and $R_4$ substituents corresponding to the desired compound and is illustrated by the following equation wherein $A_1$, $A_2$, $R_1$, $R_2$, $R_3$, $R_4$ and $R_5$ are defined as before:

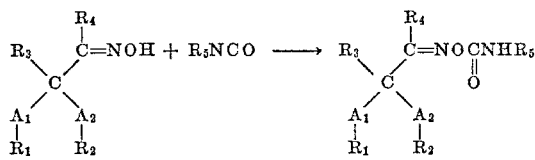

The isocyanate addition can be carried out, generally, by contacting the oxime with the isocyanate in an inert organic solvent, and preferably in the presence of a tertiary amine as a catalyst. The reaction may be effected at temperatures ranging from about 10° C. to about 130° C. and is preferably carried out between room temperature and 80° C. Generally, temperatures substantially in excess of about 130° C. are to be avoided in view of the temperature sensitivity of the product carbamoyloxime. The operating pressure may range from about 1 atmosphere to about 10 atmospheres, preferably from about 1 to about 3 atmospheres, and is dependent upon the concentration and vapor pressure of the volatile isocyanate at the reaction temperature. The inert organic solvents that can be employed in the reaction are those inert to isocyanates in general, i.e. those free of radicals such as hydroxy or amino radicals. Illustrative solvents are aliphatic ketones such as acetone, aliphatic and aromatic hydrocarbons, such as hexane, heptane, octane, benzene, toluene and the like, and others such as diethyl ether, ethyl propyl ether and the like. Generally, amounts of said teritary amine catalyst from about 0.1 to about 1.0 weight percent of the starting material comprised of an isocyanate and the oxime are sufficient. Aliphatic and/or aromatic tertiary amines are useful for this purpose, e.g. dimethylaniline, triethylamine or the like. The mole ratio of isocyanate to oxime can range from about 0.25:1 to about 2:1, but preferably an equimolar amount or slight excess of the isocyanate is employed to insure that the oxime is completely reacted. The reaction time may vary from about 5 minutes to about 7 days, but normally when operating in the preferred temperature range, reaction times of from about one-half hour to about 5 hours are sufficient for complete reaction.

The carbamoyloxime product formed, either a solid or oily liquid, can be recovered from the reaction mixture by means known to the art, e.g. by vacuum-distillation to drive off solvent and excess isocyanate.

Another synthetic route involves the reaction of a substituted oxime with phosgene to form the chloroformate which in turn is reacted with a compound containing a reactive amino $$(-\overset{|}{\text{N}}\text{H})$$

function such as a primary or secondary amine, substituted hydroxylamines and the like to give the desired oxime carbamate of this invention. The synthesis is illustrated by the following equations wherein $A_1$, $A_2$, $R_1$, $R_2$, $R_3$, $R_4$, $R_5$ and $R_6$ are defined as before:

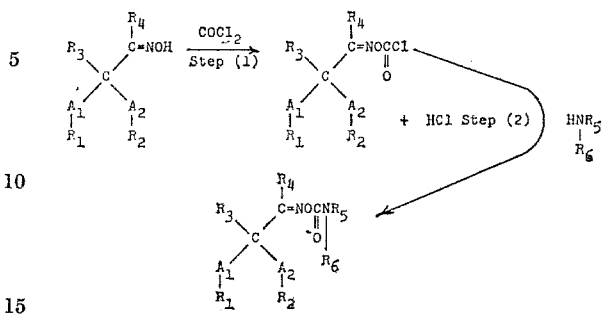

In step (1) above, a solution of the oxime compound in e.g. ethyl ether is conveniently added slowly to a solution of phosgene in toluene or ethyl ether or other suitable organic solvent in the presence of a hydrochloric acid acceptor such as a suitable amine, e.g. dimethyl aniline. The reaction can be carried out at from −30° C. to about 40° C., but will generally be found to proceed most advantageously between −10° C. and room temperature. The reaction is slightly exothermic so that some external cooling is usually necessary to maintain the temperature within the desired range. The reaction mixture can be washed with water to remove the byproduct amine hydrochloride and the organic layer containing the chloroformate (IV) can be used for further reactions. The addition of the reactant containing a reactive amino function, step (2) above, is carried out in the presence of solvents for said reactant, such as water, dioxane, toluene or chloroform, at temperatures between about −40° C. and about 80° C. and preferably below about 40° C. inasmuch as the reaction proceeds smoothly even at low temperatures and is so rapid above 40° C. that loss of low boiling reactants may occur and some decomposition may take place.

The sulfinyl- and sulfonyl-linked compounds of our invention are prepared by oxidizing the corresponding sulfide-linked carbamoyloxime compound of the invention with dilute solutions of peracetic acid or with sodium metaperiodate. Alternatively, the oxidation step may be carried out using the alkanal, alkanone or oxime intermediates, using selective conditions known to the art. It may be desirable, or even necessary, to protect the carbonyl group before oxidation, for example by forming the acetal or ketal.

The invention will be further understood by reference to the following illustrative and non-limiting examples, in which all parts are by weight unless otherwise noted. All melting points given are uncorrected.

EXAMPLE 1

α,α-Bis(methylthio)propionaldehyde oxime N-methylcarbamate

N,N,N′,N′-Tetramethylethylenediamine (11.6 g., 0.1 mole) is added to 71.5 ml. of 1.4 N n-butyllithium in hexane at −20° C. Acetaldehyde dimethyldithioacetal (12.2 g., 0.1 mole) is added dropwise to this mixture. After 2 hours, 8.05 g. of dimethylformamide (0.11 mole) is added dropwise. The reaction is allowed to warm to room temperature and stirred overnight. The mixture is poured into 200 ml. of water, acidified and extracted with 75 ml. of hexane three times. The combined extracts are washed with 100 ml. of 2 percent potassium hydroxide and 50 ml. of water two times, dried over magnesium sulfate and evaporated in vacuo. The residue weighs 9.95 g. The infrared spectrum of the product is consistent with the assigned structure for α,α-bis(methylthio)propionaldehyde.

α,α - bis(methylthio)propionaldehyde (9.95 g., 55 mmoles), potassium acetate (6.47 g., 66 mmoles) and hydroxylamine hydrochloride (4.58 g., 66 mmoles) are refluxed 3 hours in 80 ml. of ethanol. Potassium chloride is removed by filtration and the filtrate evaporated to near dryness. The addition of ice precipitates a cream solid which is collected by filtration. The infrared spectrum is consistent with the assigned structure for α,α-bis(methylthio)propionaldehyde oxime.

Four drops of triethylamine and 3.8 g. of α,α-bis(methylthio)propionaldehyde oxime (23 mmoles) are dissolved in 30 ml. of chloroform. Methyl isocyanate (5.24 g., 92 mmoles) in 10 ml. of chloroform is added dropwise, with stirring. The mixture is heated to reflux, refluxed for two hours and then evaporated in vacuo. The residual oil is triturated with a 50/50 mixture of hexane and benzene. This solid is recrystallized from 50/50 hexane/benzene, and the product has a melting point of 62–65° C. Its infrared and proton magnetic resonance spectra are consistent with the assigned structure of the desired carbamoyloxime compound.

*Analysis.*—Calculated for $C_7H_{14}N_2O_2S_2$ (percent): C, 37.8; H, 6.3; N, 12.6. Found (percent): C, 38.1; H, 6.1; N, 12.4.

Using the procedure of Example 1 the products of the following table are obtained using commercially available isocyanates as the reactants.

A stirred mixture of 162.4 g. of 2-formyl-2-methyl-1,3-dithiolane (1.1 moles), 83.4 g. of hydroxylamine hydrochloride (1.2 moles), 117.8 g. of potassium acetate (1.2 moles) and 1:1 ethanol-water (1.0 liter) is heated at reflux for 6 hours, then cooled in a freezer overnight. White crystals of 2-formyl-2-methyl-1,3-dithiolane oxime are collected by filtration, washed with a cold solution of 1:1 ethanol-water (200 ml.) and dried in vacuo, M.P. 104–106.5° C.

*Analysis.*—Calculated for $C_5H_9NOS_2$ (percent): C, 36.8; H, 5.6; N, 8.6. Found (percent): C, 37.0; H, 5.5; N, 8.3.

Using the general method described, the following oxime intermediates of the present invention are prepared from the compounds described above in Example 6.

2-formyl-2-methylcyclohexano-1,3-dithiolane oxime,
2-formyl-2,4,6-trimethyl-1,3-dithiane oxime,
2-formyl-2-methyl-1,3-dithiane oxime,
2-formyl-2,4-dimethyl-1,3-dithiolane oxime,
2-formyl-2,5-dimethylbenzo-1,3-dithiolane oxime,
2-formyl-2-methyl-4-phenyl-1,3-dithiolane oxime,
2-formyl-2,4-dimethyl-1,3-dithiane oxime,
4-ethyl-2-formyl-2-methyl-1,3-dithiolane oxime,

TABLE I

| Example No. | Reactants | | Product |
|---|---|---|---|
| | Oxime | Isocyanate | |
| 2 | α,α-Bis(methylthio)propionaldehyde oxime | n-Butyl isocyanate | α,α-Bis(methylthio)propionaldehyde oxime N-n-butylcarbamate. |
| 3 | do | Allyl isocyanate | α,α-Bis(methylthio)propionaldehyde oxime N-allylcarbamate. |
| 4 | do | Ethyl isocyanate | α,α-Bis(methylthio)propionaldehyde oxime N-ethylcarbamate. |
| 5 | do | Cyclohexyl isocyanate | α,α-Bis(methylthio)propionaldehyde oxime N-cyclohexylcarbamate. |

EXAMPLE 6

2-formyl-2-methyl-1,3-dithiolane oxime N,N-dimethylcarbamate

A stirred mixture of 360.3 g. of a 40 percent aqueous solution of pyruvaldehyde (2.0 moles), 179 g. of 1,2-ethanedithiol (1.90 moles), 600 ml. of benzene and 2.0 g. of p-toluenesulfonic acid hydrate is heated at reflux for 4 hours, during which time about 175 ml. of water separates in a Dean-Stark trap. The dark brown solution is stirred for 6 hours at room temperature, then poured into 300 ml. of diethyl ether. This solution is washed with 500 ml. of 5-percent sodium bicarbonate solution, then 500 ml. of water, and dried over magnesium sulfate. The dried solution is fractionally distilled under water pump vacuum, and the fraction boiling from 105 to 108° C. is examined by infrared analysis. The spectrum of the fraction is consistent for the structure of 2-formyl-2-methyl-1,3-dithiolane.

*Analysis.*—Calculated for $C_5H_8OS_2$ (percent): C, 40.5; H, 5.4. Found (percent): C, 40.7; H, 5.6.

Using the general method described, the following derivatives of α-dicarbonyl compounds useful as intermediates for the preparation of oxime intermediates of the present invention are prepared from known starting materials. These intermediates are identified by their method of synthesis and infrared spectra.

2-formyl-2-methylcyclohexano-1,3-dithiolane,
2-formyl-2,4,6-trimethyl-1,3-dithiane,
2-formyl-2-methyl-1,3-dithiane,
2-formyl-2,4-dimethyl-1,3-dithiolane,
2-formyl-2,5-dimethylbenzo-1,3-dithiolane,
2-formyl-2-methyl-4-phenyl-1,3-dithiolane,
2-formyl-2,4-dimethyl-1,3-dithiane,
4-ethyl-2-formyl-2-methyl-1,3-dithiolane,
2-acetyl-2-methyl-1,3-dithiolane,
2-acetyl-2,4-dimethyl-1,3-dithiolane, and
2-ethyl-2-propionyl-1,3-dithiolane.

2-acetyl-2-methyl-1,3-dithiolane oxime,
2-acetyl-2,4-dimethyl-1,3-dithiolane oxime, and
2-ethyl-2-propionyl-1,3-dithiolane oxime.

To a stirred, cold (0–5° C.) solution of 24 g. of N,N-dimethylaniline (0.2 mole) and 200 ml. of diethyl ether under a nitrogen atmosphere and protected by a Dry Ice condenser is added by bubbling 22 g. of gaseous phosgene (0.22 mole). As the solution becomes cloudy, 32.6 g. of 2-formyl-2-methyl-1,3-dithiolane oxime (0.20 mole) dissolved in 200 ml. of diethyl ether is added dropwise while maintaining the reaction temperature between −5 and +5° C. After the completion of the addition, the reaction is stirred for an additional hour at 0° C., then filtered. The colorless filtrate is reduced in volume to 240 ml.

To an 80 ml. portion of this filtrate maintained at 0–5° C. is added dropwise with stirring 9.0 g. of dimethylamine (0.20 mole). This solution is stirred for an additional hour at 0° C., and the white solid product removed by filtration. Recrystallization from n-hexane gives white crystals, M.P. 75–76° C. The infrared spectrum of the compounds is consistent with the structure of 2-formyl-2-methyl-1,3-dithiolane oxime N,N-dimethylcarbamate.

EXAMPLE 7

4-butyl-2-formyl-2-methyl-1,3-dithiolane oxime N,N-dimethylcarbamate

Using the procedure of Example 6 and replacing 2-formyl-2-methyl-1,3-dithiolane with 4-butyl-2-formyl-2-methyl-1,3-dithiolane the desired product is obtained, as indicated by infrared spectral analysis, as white crystals when recrystallized from n-hexane.

EXAMPLE 8

2-Formyl-2-methyl-1,3-dithiolane oxime N-methylcarbamate

To a stirred solution of 2-formyl-2-methyl-1,3-dithiolane oxime (81.6 g., 0.50 mole), triethylamine (1.0 ml.) and acetone (50 ml.) is added 30.8 g. of methyl isocyanate (0.54 mole) in 50 ml. of acetone. This reaction mixture is heated at reflux temperature for 12 hours, cooled and filtered. The volume of the solution is reduced to about 250 ml. by evaporation under vacuum. The product is obtained as a white solid and recrystallized from acetone, M.P. 122–124° C. The infrared spectrum is consistent with the assigned structure.

*Analysis.*—Calculated for $C_7H_{12}N_2O_2S_2$ (percent): C, 38.2; H, 5.5. Found (percent): C, 38.0; H, 5.4.

Using the procedure of Example 8 the products of the following table are obtained using commercially available isocyanates as reactants. The oximes may be prepared as in Example 6.

fifteen minutes a solution of sodium metaperiodate (9.0 g., 42 mmoles) in water (100 ml.). A white precipitate forms. The mixture is stirred cold (5–10° C.) for 45 minutes and filtered. The filtrate is evaporated in vacuo, removing the solvent. The residue is extracted three times with chloroform (50 ml. portions), the extracts are dried over magnesium sulfate, and the chloroform removed in vacuo. Diethyl ether is added to the residue, then removed in vacuo. Chloroform and hexane are added to the residue and the mixture is heated. The product, 2-formyl-2-methyl-1,3-dithiolane oxime N-methylcarbamate S,S'- dioxide, M.P. 126° C. (dec.), a tan solid, is removed by

TABLE II

| Example No. | Reactants | | Product |
|---|---|---|---|
| | Oxime | Isocyanate | |
| 9 | 2-formyl-2-methyl-1,3-dithiolane oxime | Ethyl isocyanate | 2-formyl-2-methyl-1,3-dithiolane oxime N-ethylcarbamate, M.P. 122–125° C. |
| 10 | do | n-Butyl isocyanate | 2-formyl-2-methyl-1,3-dithiolane oxime N-n-butylcarbamate, M.P. 67–70° C. |
| 11 | do | Allyl isocyanate | 2-formyl-2-methyl-1,3-dithiolane oxime N-allylcarbamate, M.P. 53–54° C. |
| 12 | 2-formyl-2-methyl-1,3-dithiane oxime, M.P. 145–147.5° C. | Methyl isocyanate | 2-formyl-2-methyl-1,3-dithiane oxime N-methylcarbamate, M.P. 96–99° C. |
| 13 | 2-formyl-2,4-dimethyl-1,3-dithiolane oxime, M.P. 63–65° C. | do | 2-formyl-2,4-dimethyl-1,3-dithiolane oxime N-methylcarbamate, M.P. 73–76° C. |
| 14 | 2-formyl-2,4,6-trimethyl-1,3-dithiane oxime | do | 2-formyl-2,4,6-trimethyl-1,3-dithiane oxime N-methylcarbamate, M.P. 46–50° C. |
| 15 | 2-formyl-2-methycyclohexano-1,3-dithiolane oxime | do | 2-formyl-2-methylcyclohexano-1,3-dithiolane oxime N-methylcarbamate, M.P. 132–134° C. |
| 16 | 2-formyl-2-methyl-1,3-dithiolane oxime | t-Butyl isocyanate | 2-formyl-2-methyl-1,3-dithiolane oxime N-t-butylcarbamate, M.P. 84–86° C. |
| 17 | 2-formyl-2,5-dimethylbenzo-1,3-dithiolane oxime | Methyl isocyanate | 2-formyl-2,5-dimethylbenzo-1,3-dithiolane oxime N-methylcarbamate, M.P. 125–127° C. |
| 18 | 2-formyl-2-methyl-4-phenyl-1,3-dithiolane oxime | do | 2-formyl-2-methyl-4-phenyl-1,3-dithiolane oxime N-methylcarbamate, M.P. 129–132° C. |
| 19 | 2-formyl-2,4-dimethyl-1,3-dithiane oxime | do | 2-formyl-2,4-dimethyl-1,3-dithiane oxime N-methylcarbamate, M.P. 106–107° C. |
| 20 | 4-ethyl-2-formyl-2-methyl-1,3-dithiolane oxime | do | 2-ethyl-2-formyl-2-methyl-1,3-dithiolane oxime N-methylcarbamate. |
| 21 | 2-acetyl-2-methyl-1,3-dithiolane oxime | do | 2-acetyl-2-methyl-1,3-dithiolane oxime N-methylcarbamate, M.P. 107–109° C. |
| 22 | 2-acetyl-2,4-dimethyl-1,3-dithiolane oxime | do | 2-acetyl-2,4-dimethyl-1,3-dithiolane oxime N-methylcarbamate, M.P. 89–92° C. |

EXAMPLE 23

2-formyl-2-methyl-1,3-dithiolane oxime N-methylcarbamate S,S'-bisdioxide

To a stirred, cold (0–5° C.) solution of 2-formyl-2-methyl-1,3-dithiolane oxime N-methylcarbamate (4.4 g., 0.02 mole) in glacial acetic acid (75 ml.) is added dropwise 30 percent hydrogen peroxide solution (18.1 g., 0.16 mole). The solution is then heated to reflux for 2.5 hours. Next, 75 ml. of water is added, and the solution is cooled slowly. White crystals separate and are collected by filtration, M.P. 155° C. (dec.). The infrared spectrum is consistent with the assigned structure.

EXAMPLE 24

2-formyl-2-methyl-1,3-dithiolane oxime N-methylcarbamate S-oxide

To a cold (0–5° C.) solution of 2-formyl-2-methyl-1,3-dithiolane oxime N-methylcarbamate (4.4 g., 0.02 mole) in methanol (100 ml.) is added sodium metaperiodate (4.3 g., 0.02 mole) in water (50 ml.). External cooling is necessary to maintain the temperature at 0–5° C. The mixture is stirred cold for 4 hours, then allowed to warm to room temperature, and the white solid is removed by filtration. The filtrate is reduced in volume in vacuo to afford an oil which slowly solidifies. Recrystallization from 1:1 ethyl acetate:benzene gives beige crystals, M.P. 96–97° C. (dec.). The infrared spectrum of this compound is consistent with the assigned structure.

EXAMPLE 25

2-formyl-2-methyl-1,3-dithiolane oxime N-methylcarbamate S,S'-dioxide

To a stirred, cold (0–5° C.) solution of 2-formyl-2-methyl-1,3-dithiolane oxime N-methylcarbamate (4.4 g., 20 mmols) in methanol (150 ml.) is added dropwise over filtration. Cooling the filtrate gives a second crop of product.

*Analysis.*—Calculated for $C_7H_{13}N_2O_4S_2$ (percent): C, 33.3; H, 4.8; N, 11.1. Found (percent): C, 33.0; H, 4.8; N, 11.0.

The carbamoyloxime derivatives of the invention are tested for nematocidal activity by a standard test method using roots of tomato plants infested with nematodes (*Meloidogyne incognita*, var. acrita). They are tested for acaricidal activity by a standard test method using cotton plants infested with *Tetranychus telarium* and for their insecticidal activity using houseflies (*Musca domestica*) and mosquito larvae (*Aedes aegypti*).

The following compounds were found to have a particularly high degree of activity as nematocides, acaricides or insecticides:

2-formyl-2-methyl-1,3-dithiolane oxime N-methylcarbamate, 2-formyl-2-methyl-1,3-dithiane oxime N-methylcarbamate, 2-formyl-2,4-dimethyl-1,3-dithiolane oxime N-methylcarbamate.

While all of the carbamyloxime compounds falling within the scope of the present invention as described in the general formula set forth hereinabove exhibit some nematocidal or insecticidal activity, it is to be understood that some are more effective than others. The above-listed compounds are examples of preferred embodiments which exhibit high activity, particularly as nematocides.

The compounds contemplated in this invention may be applied as insecticides, acaricides and nematocides according to methods known to those skilled in the art. Pesticidal compositions containing the compounds as the active toxicant will usually comprise a carrier or diluent, either liquid or solid.

Liquid concentrates may be prepared by dissolving one of these compounds with a solvent such as acetone or xylene and dispersing the toxicants in water with the aid of suitable surface active agents, i.e. dispersing and emulsifying agents.

The choice of dispersing and emulsifying agent and the amount employed is dictated by the nature of the composition and the ability of the agent to facilitate the dispersion of the toxicant. Generally, it is desirable to use as little of the agent as is possible, consistent with the desired dispersion of the toxicant in the spray so that rain does not re-emulsify the toxicant after it is applied to the plant and wash it off the plant. Nonionic, anionic or cationic surface active agents may be employed, for example, the condensation products, of alkylene oxides with phenol and organic acids, alkyl aryl sulfonates, complex ether alcohols, quaternary ammonium compounds, and the like.

In the preparation of wettable powder or dust or granulated compositions, the active ingredient is dispersed in and on an appropriately divided solid carrier such as clay, talc, bentonite, diatomaceous earth, charcoal, corn cob granules, fullers earth, and the like. In the formulation of the wettable powders the aforementioned surface active agents as well as lignosulfonates can be included.

The required amount of the toxicants contemplated herein may be applied per acre treated in from 1 to 200 gallons or more of water as diluent or in from about 5 to 500 pounds of inert solid carrier or diluent. The concentration in the liquid concentrate will usually vary from about 5 to 30 percent by weight, and in the solid formulations from about 2 to about 80 percent by weight. The formulations are applied in amounts which contain from about one-fourth to 15 pounds of active toxicant per acre.

The pesticides contemplated herein prevent attack by insects, mites and nematodes upon plants or other material to which the pesticides are applied, and they have high residual toxicity. With respect to plants they have a high margin of safety in that when used in sufficient amount to kill or repel the insects, they do not burn or injure the plant. The toxicants are sufficiently chemically inert that they are compatible with substantially any other constituents of the spray schedule, and they may be used in the soil, upon the seeds or the roots of plants without injuring either the seeds or roots of plants, yet by imbibition or root uptake they may kill the pests feeding thereon. Furthermore, their properties are such that they are not unacceptably hazardous to the user.

Some of the novel oximes of this invention have central nervous system depressant activity such as muscle relaxation and sedation.

What is claimed is:
1. A compound of the formula

$$\begin{array}{c} R_1A_1 \\ R_2A_2 \end{array} C \begin{array}{c} R_3 \\ C=NOCN \\ | \quad \| \quad R_6 \\ R_4 \quad O \end{array} \begin{array}{c} R_5 \\ R_6 \end{array}$$

wherein $A_1$ and $A_2$ are independently selected from the group consisting of thio, sulfinyl and sulfonyl linkages, $R_1$, $R_2$ and $R_3$ are independently selected from the group consisting of lower alkyl and lower alkenyl, or $R_1$ and $R_2$ taken together form an alkylene or alkenylene group having up to 12 carbon atoms, 2 to 5 carbon atoms of which form a chain linking the sulfur atoms, $R_4$ is hydrogen or lower alkyl, and $R_5$ and $R_6$ are independently selected from the group consisting of hydrogen and alkyl, cycloaliphatic, alkoxy and alkenyl radicals having up to 10 carbon atoms, and only one of $R_5$ and $R_6$ may be hydrogen.

2. The compound $\alpha,\alpha$-bis(methylthio)propionaldehyde oxime N-methylcarbamate.

3. The compound 2 - formyl - 2-methyl-1,3-dithiolane oxime N-methylcarbamate.

4. The compound 2 - formyl - 2-methyl-1,3-dithiane oxime N-methylcarbamate.

5. The compound 2-formyl-2,4-dimethyl-1,3-dithiolane oxime N-methylcarbamate.

6. The compound 2 - acetyl - 2-methyl-1,3-dithiolane oxime N-methylcarbamate.

7. The compound 2 - acetyl - 2,4-dimethyl-1,3-dithiolane oxime N-methylcarbamate.

References Cited

UNITED STATES PATENTS

| | | | |
|---|---|---|---|
| 3,193,561 | 7/1965 | Addor | 260—327 |
| 3,217,037 | 11/1965 | Payne, et al. | 260—566 |
| 3,317,562 | 5/1967 | Addor | 260—327 |
| 3,337,396 | 8/1967 | Spurr | 167—22 |
| 3,459,866 | 8/1969 | Buchanan | 424—327 |
| 3,467,672 | 9/1969 | Addor | 260—327 |

HENRY R. JILES, Primary Examiner

C. M. SHURKO, Assistant Examiner

U.S. Cl. X.R.

260—453 R, 566 A, 566 AC, 593 R, 601 R; 424—277, 327